United States Patent

[11] 3,548,979

| [72] | Inventors | John P. Nelson;<br>Joseph F. Dernovshek; Hal E. Miller,<br>Akron; Clifton A. Byers, Cuyahoga Falls,<br>Ohio |
|---|---|---|
| [21] | Appl. No. | 801,595 |
| [22] | Filed | Feb. 24, 1969 |
| [45] | Patented | Dec. 22, 1970 |
| [73] | Assignee | The Goodyear Tire & Rubber Company<br>Akron, Ohio<br>a corporation of Ohio<br>Continuation-in-part of Ser. No. 666,705,<br>Sept. 11, 1967, now abandoned. |

[54] BRAKE ELEMENT WITH HIGH HEAT SINK CHARACTERISTICS
13 Claims, 5 Drawing Figs.

[52] U.S. Cl..................................................... 188/264,
188/218; 192/107, 192/113
[51] Int. Cl....................................................... F16d 65/84
[50] Field of Search............................................188/218AX,
264CC; 192/107, 113; 23/209.1P

[56] References Cited
UNITED STATES PATENTS
| 3,079,273 | 2/1963 | Johnson | 117/46 |
| 3,188,961 | 6/1965 | Scruggs et al. | 188/264(CC)X |
| 3,208,559 | 9/1965 | Chambers et al. | 188/264(CC) |
| 3,403,759 | 10/1968 | Holcomb, Jr. | 188/218(Axial) |
| 3,459,284 | 8/1969 | Wray | 188/264(CC) |

OTHER REFERENCES

Gardner, Annesta R. Pyrolytic Graphite. In Product Engineering. Vol. 33, p. 72-75. Jan. 22, 1967. Copy in Group 110, Class 23, Subclass 209.1P.

Anisotropic Graphite Gets a Play, In Chem. & Eng. News. 37 (56). Nov. 30, 1959. Copy in Group 110, Class 23, Subclass 209.1P.

*Primary Examiner*—George E. A. Halvosa
*Attorneys*—F. W. Brunner, P. E. Milliken and Oldham & Oldham ABSTRACT: A low weight heat sink brake element which specifically encapsulates a heat sink material, such as graphite, as the core of a hollowed out, substantially standard brake element, or uses small pads mounted to the friction or braking surface of the brake element which pads encapsulate heat sink material such as graphite with a thin metal outer shell to act as the friction receiving surface. Such a design employs the metallic shell or housing as the structural member, and the core acts only as a heat absorber. Therefore, with this design, low strength, high specific heat materials that were previously incapable of functioning in a brake for purposes of heat sink action can be used.

INVENTORS
CLIFTON A. BYERS
JOSEPH F. DERNOVSHEK
HAL E. MILLER
JOHN P. NELSON
BY Oldham & Oldham
ATTORNEYS

BRAKE ELEMENT WITH HIGH HEAT SINK CHARACTERISTICS

This application is a continuation-in-part of our prior application Ser. No. 666,705, for Brake Element With High Heat Sink Characteristics, filed Sept. 11, 1967, now abandoned.

Heretofore it has been well known that heat sinks are provided as part of braking systems to absorb the thermal energy created on the friction surfaces. Generally, the heat sinks are very heavy to protect the friction elements from the effects of extreme heat. The aforementioned effects, if allowed to persist, would cause fast wear of the friction material and distortion of the elements which greatly reduces brake life. Many attempts have been made to reduce the heat sink weight such as direct and indirect cooling to reduce peak temperatures; various coatings to improve diffusivity and reduce heat shock; high specific heat and conductive materials. However, further changes and improvements are needed to cope with the weight and life problem as experienced on large aircraft brakes. These are particularly applicable to a disc brake wherein the friction elements are stacked in particular arrangements.

Therefore, it is the general object of the present invention to meet the needs of the art by providing an improved heat sink braking element which is of low weight and which readily dissipates heat generated during braking, as well as providing a uniform heat in the braking or friction element to eliminate dishing and the like caused by unequal expansion or contraction during the intense heat buildup occurring during a high performance stop.

The aforesaid object of the invention is achieved by providing in a brake element the combination of a hollow metallic housing having at least one surface shaped to cooperate with a friction element, and a high specific heat high density material positioned in the hollow interior of the housing where the material has a high heat sink characteristic and is in intimate contact with at least the interior surfaces of the metallic housing.

For a better understanding of the invention reference should be had to the accompanying drawings wherein.

It should be understood that the basic idea of the invention is to employ a core material encapsulated within a metallic shell, which is preferably steel, and which core material has a higher specific heat than the shell. This results in less weight to the resultant brake element to absorb a given amount of kinetic energy and achieve a given temperature, than if the element were all steel.

Figure 1:
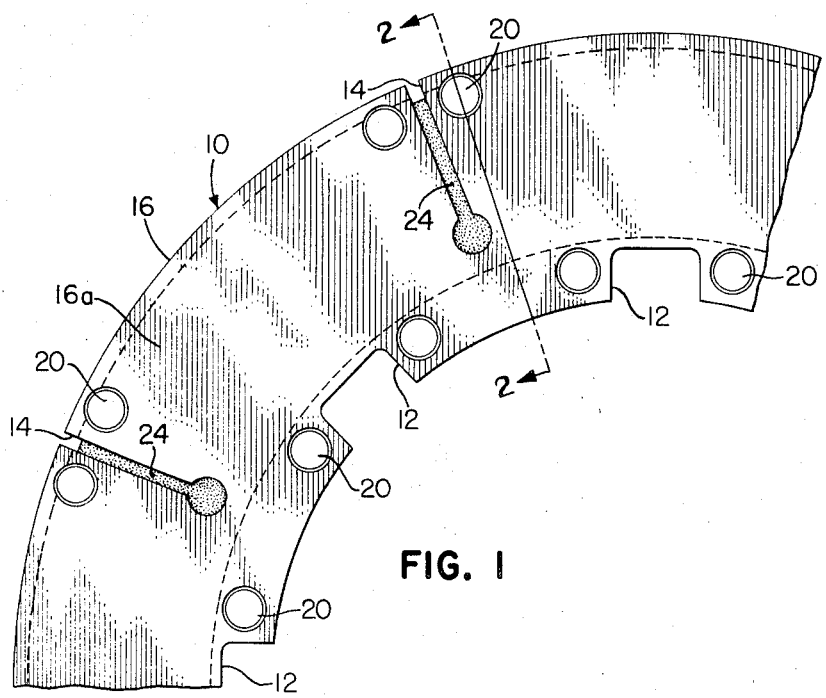
FIG. 1 is a broken-away, side elevational view of a braking element employing a preferred embodiment of the invention.

With reference to the embodiment of the invention illustrated in FIG. 1 of the drawings, numeral 10 indicates generally a brake disc which normally is associated with a stack of discs to provide a disc brake for an airplane. In the usual practice, stationary discs are interleaved between rotating discs, with all the discs being able to slide axially, being slidably keyed to either stationary positions on the axle or to rotate with the wheel, respectively. The invention contemplates that the element 10 might, however, take a different shape or form depending upon the particular braking use to which it is to be applied. The disc configuration is only illustrated for purposes of explaining the structure and characteristics of the invention.

The particular disc shown is a stationary disc and has notches 12 radially spaced on the internal circumference thereof to cooperate with keys carried in fixed relationship by the axle, all in the usual manner. A plurality of expansion slots 14, also conventional for this type brake disc, are provided.

Figure 2:
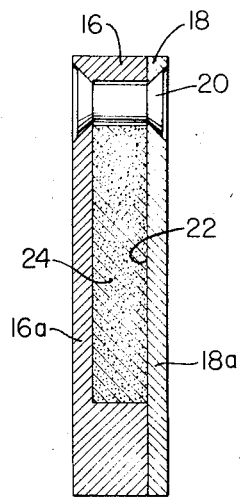
FIG. 2 is a vertical, cross-sectional view of the element of FIG. 1 taken on line 2—2 thereof.

The element of the disc brake 10 is actually made up as a hollow shell comprising portions 16 and 18 held together by rivets 20 to define a hollow interior 22, all as best seen in FIG. 2 of the drawings. While this embodiment illustrates portion 16 defining the cavity 22, and portion 18 merely being a plate covering the cavity when riveted into position therewith, the invention contemplates that the portions 16 and 18 might be symmetrical halves which are held together by appropriate rivets, or any other reasonable configuration that will define an interior cavity or a hollow relationship on the inside of the element 10. For the particular brake disc illustrated in FIG. 1, it is contemplated that the faces 16a and 18a of the respective portions 16 and 18 will be the friction receiving faces, and for the purposes of the invention the thickness of the metal in these faces or metal plates will be at least 0.040 inches, but preferably usually not greater than 0.150 inches to maximize weight saving capabilities, depending upon the particular brake requirements.

In order to obtain the desired intent of reducing weight it is preferable that the thickness of element 10 in total be at least equal to two times the total width or thickness of the material defining or forming the faces 16a and 18a, and as illustrated in FIG. 2 of the drawings, this dimension is preferably greater than two times the thickness of the material forming these faces, but should be probably less than five times the combined thickness of these faces to maintain successful efficient operation. The hollow interior is then filled with some suitable heat sink material filler, or core 24.

Particularly, the heat sink characteristic of the material 24 positioned within the hollow interior 22 should have an average specific heat greater than 0.25 B.t.u./lb./° F. for the overall temperature range 0° F. to 2,000° F., and a conductivity greater than 0.04 cal./sec./cm.$^2$/° C./cm. The density must be in excess of 0.040 lb/in$^3$, and the compressive strength in the strongest direction, i.e., the direction of brake compression, should preferably exceed 3,000 p.s.i. However, since the materials utilized as defined below may be anisotropic in physical makeup, the direction of greatest compressive strength and heat transfer should, if possible, lie in the direction of brake compression. In fact, when using an anisotropic material for the heat sink filler or core, a feature of the invention is to orient the material with the interior 22 so that the axis of best heat transfer is substantially perpendicular to the faces 16a and 18a. In this manner, the greatest heat transfer and compressive strength is achieved. Preferably, the specific heat of the material should increase at highest temperatures and approach 0.5 B.t.u./lb.° F. at about the usual operating temperature of the brake element.

The heat sink material used as the filler comprises essentially a carbon base. The carbon base may be carbon itself, particularly in the form of graphite or amorphous carbon, or carbon compounds typical of which are the carbides such as boron carbide, silicone carbide and titanium carbide. Mixtures of carbon in its various forms may, of course, be used. In addition to the carbon base other ingredients may be used such as antioxidants, binders, fillers, strengthening agents, and reinforcing fibers. Whether the carbon base is used by itself or in a mixture with any of the ingredients mentioned above, the carbon base should be at least 20 percent by weight of the filler. It is preferred that the heat sink filler comprises greater than 50 percent by volume of carbon base, and for optimum operating conditions greater than 90 percent by volume of carbon base. Typical specific materials useful for such fillers and commercially available are Karbate, AGSR, CS AUC, as made by Union Carbide Company, Boride "Z," "HD " G-83, A-83 and CARBITEX as made by Carborundum Company. Some of these commercial materials come in solid state and can be formed by cutting and/or machining to the desired configuration, while others are powdered and thus use appropriate binders to mold the powdered configuration. Either the powdered or solid forms will function effectively.

The invention further contemplates that the hollow portions of the element 10 should cover at least 65 percent of the friction-engaging surfaces thereof in order to provide the necessary heat sink qualities to eliminate warping or shorten the useful life of the particular element. The jacket material should preferably be steel, and typical steels found satisfactory are 4130, Waspaloy, HRB Crucible H12, and P-21.

Figure 3:
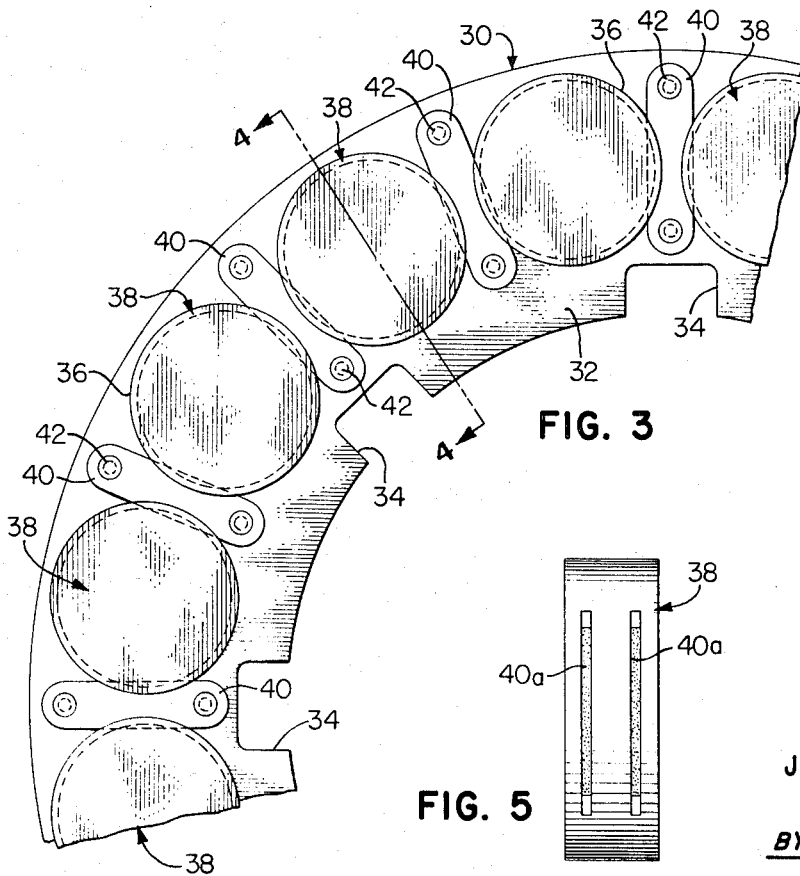
FIG. 3 is a broken-away, side elevational view of another embodiment of the invention employing substantially circular carrier pads.

FIG. 3 illustrates a modified embodiment of the invention wherein a brake element indicated generally by numeral 30 comprises a solid metallic carrier plate 32 which preferably is made from a high grade steel or steel alloy, and again in this instance is a stationary disc for use in a disc type brake, and thus has a plurality of slots 34 cut into the inner circumference thereof. The objects of the invention are achieved in this element 30 by providing a plurality of holes 36 equally radially spaced around the surface thereof, each hole receiving a button 38, which buttons are made in substantially the same manner as the entire element 10 of FIG. 1.

Figure 5:
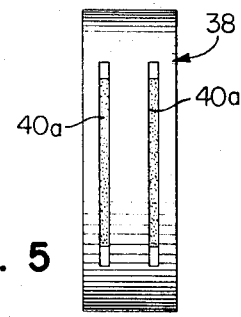
FIG. 5 is an end elevation of one of the pads of the embodiment of FIG. 3.
Figure 4:
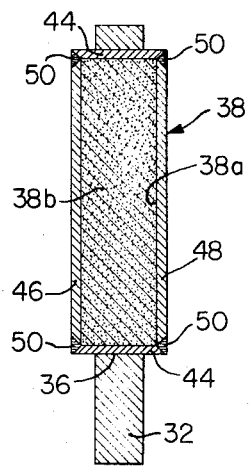
FIG. 4 is a vertical, cross-sectional view of the pad arrangement of FIG. 3 taken on line 4—4 thereof.

Specifically, the buttons 38 are hollow steel shells of greater thickness than the member 32, and mounted into position with respect to member 32 by removable retainer links 40 which are secured by rivets 42 to the carrier member 32. The links 40 fit into appropriate slots 40a on each edge of elements 38, which slots 40a, as best seen in FIG. 5 of the drawings, thereby hold the elements on both sides of carrier member 32 to secure the positioning thereof.

The element 38 essentially can be made in any convenient manner to define a hollow interior portion 38a into which a heat sink material 38 b can be appropriately received, in the same manner as defined with reference to element 10 above. The actual structure of the elements 38 can vary, but for the purposes of showing one embodiment, the element 38 comprises an annular ring 44 with circular end plates 46 and 48 fitting snugly inside the ring on each end thereof, and being appropriately held in position, as by welding, around the circumference thereof at 50.

In this embodiment of the invention, the thickness of the end plates 46 and 48 should be of approximately the same ratio as set forth above with reference to element 10, as should the size of the interior portion 38a. Further, the type of heat sink material 38b utilized can also have approximately the same characteristics. Again, it has been found preferable to utilize a carbon base such as graphite, a graphite and other carbon particles mixture, or carbides for the heat sink material 38b. In this embodiment of the invention it should be understood that any one of the elements 38 which may fail can be readily and easily replaced at low cost. However, because of the excellent heat sink characteristics of the elements 38 provided by their construction with the hollow portion 38a and the heat sink filler or core material 38b, there is excellent heat absorption. Hence, a rapid heat buildup because of friction on the surfaces of the end plates 46 or 48, or both, is substantially eliminated, and therefore failure of these elements is quite minimal.

With respect to both embodiments of the invention, it is critical that the heat sink material be in very close contact over substantially the entire friction surface area. This type of intimate contact is necessary to achieve the convective heat transfer characteristics desired by the invention. To this end, the invention contemplates that the thickness of the heat sink material must be not less than 0.002 inches under, nor greater than 0.010 inches over the exact thickness of its receiving cavity within the brake element. These close tolerance relationships are possible because of the similarity in thermal expansion characteristics of the heat sink material and the metallic shell. In fact the thermal expansion coefficient of the heat sink material should not be any greater than the thermal expansion coefficient of the shell. The specific heat of the encapsulated material dictates the number of pounds required, and the density thus dictates what volume will be necessary in the hollowed portion of the disc.

It has been found that use of the encapsulated heat sink of the invention can decrease total disc weight by as much as 30 percent. The reason that this type of encapsulated structure is possible resides in the fact that all steel discs are larger than for mechanical load requirements, but about the right size for heat sink or thermal requirements. Hence, while the hollowing out reduces the ability to withstand mechanical loads, it is quite sufficiently above minimum safety levels. Therefore, filling the hollow with the better heat sink material results in an overall weight savings.

Thus it is seen that the objects of the invention have been achieved by providing a novel brake element having a structure at lighter weight to achieve excellent heat sink characteristics, thus reducing total aircraft weight and providing shorter turnaround times, and higher reliability to brakes utilizing elements of this type.

While in accordance with the patent statutes only the preferred embodiments of the invention have been illustrated and described, it is to be understood that the invention is not to be limited thereto or thereby.

We claim:

1. A brake element which includes a pair of metallic elements each having one face shaped to cooperate with a friction element, means to hold said metallic elements with respect to each other whereby they define a hollow portion between the metallic elements and under said faces thereof, and a carbon base filler material positioned between said metallic elements and in intimate contact therewith, said filler material having a higher specific heat than said metallic elements.

2. a brake element which comprises a metallic housing defining at least one surface shaped to cooperate with a friction element and being hollow in at least one portion under said surface, a filler material positioned in the hollow interior of the housing, said material having a higher specific heat than the housing and being shaped complementary thereto which is characterized by said material having a density less than the density of the metallic housing, and where the material has a carbon base and is selected from a group comprised of carbon, graphite, amorphous carbon, and carbon compounds such as boron carbide, silicon carbide and titanium carbide and mixtures thereof having an average specific heat greater than 0.25 B.t.u./lb./°F. for the overall temperature range 0° F. to 2,000° F., and where the material has a compressive stress in the strongest direction of at least 3,000 p.s.i. through the 0° F. to 2,000° F. temperature range.

3. A brake element according to claim 2 where the housing is made from two portions which when complementarily positioned and held together define a continuous hollow portion within substantially the entire interior thereof; with the material substantially entirely filling said hollow portion so the material is in intimate contact with the interior of the said one surface.

4. A brake element comprising:
a metallic housing defining a braking surface; and
a carbon base heat sink material positioned within the housing and in intimate contact with the interior of the braking surface where the carbon base heat sink material is at least twice the thickness of the braking surface portion of the housing in cross section through said surface and covers at least 65 percent of the interior of said surfaces, and the carbon base comprises at least 50 percent of the volume of the heat sink material.

5. A brake element according to claim 4 where said heat sink material has an average specific heat greater than 0.25 B.t.u./lb./°F. for an overall temperature range of 0° F. to 2,000° F., a density of at least 0.040 lb./in.$^3$ and a compressive stress in the strongest direction of at least 3,000 p.s.i.

6. A brake element according to claim 4 where the heat sink material is anisotropic with respect to heat and where the heat axis of the material is aligned substantially perpendicular to the braking surface of the housing.

7. In a brake element the combination of a metallic housing defining at least one surface shaped to cooperate with a friction element and being hollow in at least one portion under said surface and a carbon base filler material positioned in the hollow interior portion of the housing, said filler material having a higher specific heat than the housing and being shaped complementary to said interior portion.

8. A brake element according to claim 7 where the density of the filler material is less than the density of the metallic housing.

9. A brake element according to claim 7 where the hollow portion inside the metallic housing lies under at least 65 percent of the surface area of the outer surface.

10. A brake element according to claim 7 where the housing is made from two portions which when complementarily positioned and held together define a continuous hollow portion within substantially the entire interior thereof; with the material substantially entirely filling said hollow portion so the material is in substantially intimate contact over the interior of the said one surface.

11. A brake element according to claim 7 where the housing is a continuous steel plate having a plurality of equally spaced holes therethrough, with the cooperatively shaped surface defined by a plurality of hollow buttons mounted in said holes to extend above the surface of said plate, and wherein the buttons are filled with the material.

12. A brake element according to claim 7 where the carbon base filler material is selected from a group typically comprising carbons, graphites, and carbides, and mixtures thereof having an average specific heat greater than 0.25 B.t.u./lb./° F. for the overall temperature range 0° F. to 2,000° F.

13. A brake element according to claim 12 where the material has a density of at least 0.040 lbs./in.$^3$ and a compressive stress in the strongest direction of at least 3,000 p.s.i. throughout the 0° F. to 2,000° F. temperature range.